UNITED STATES PATENT OFFICE.

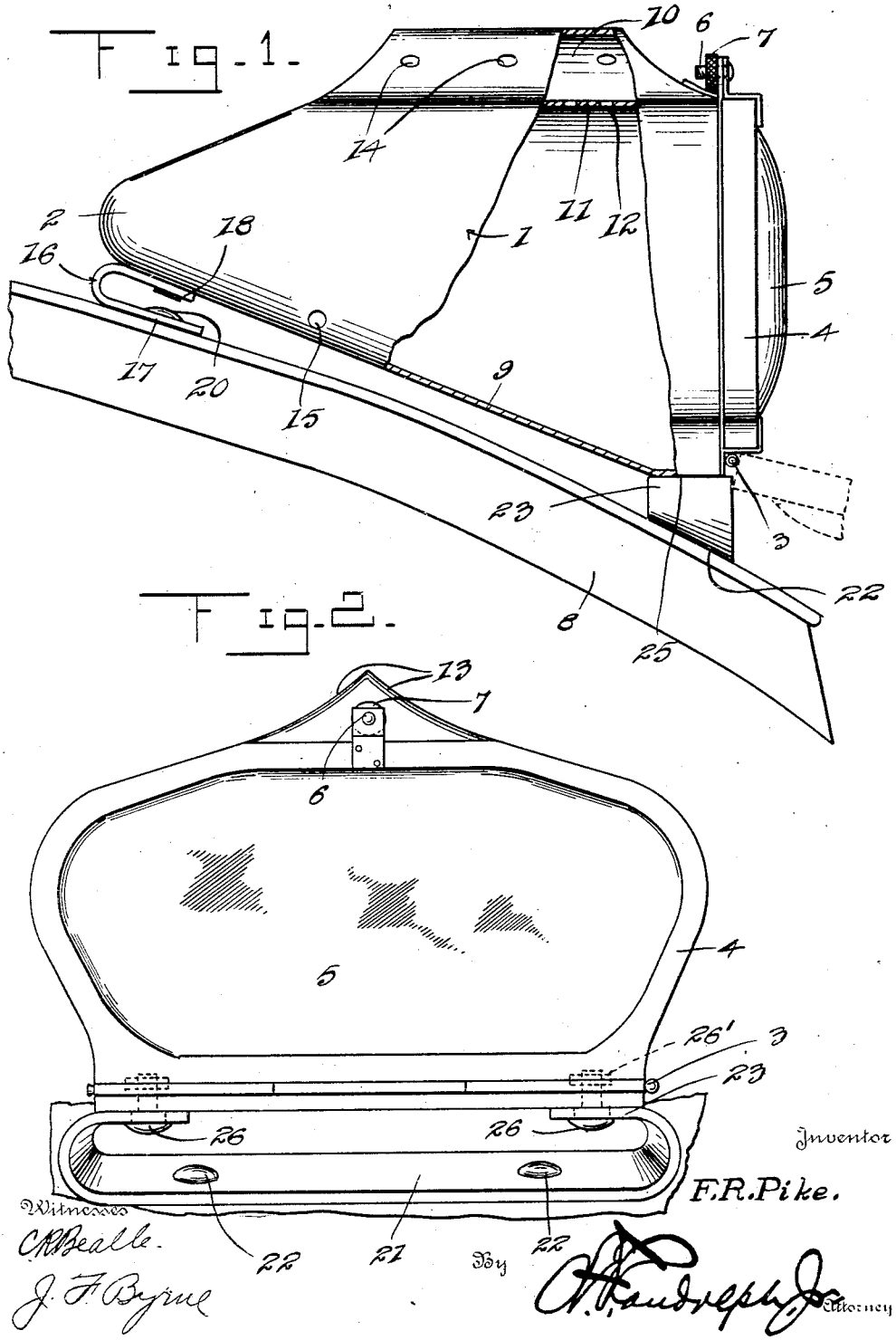

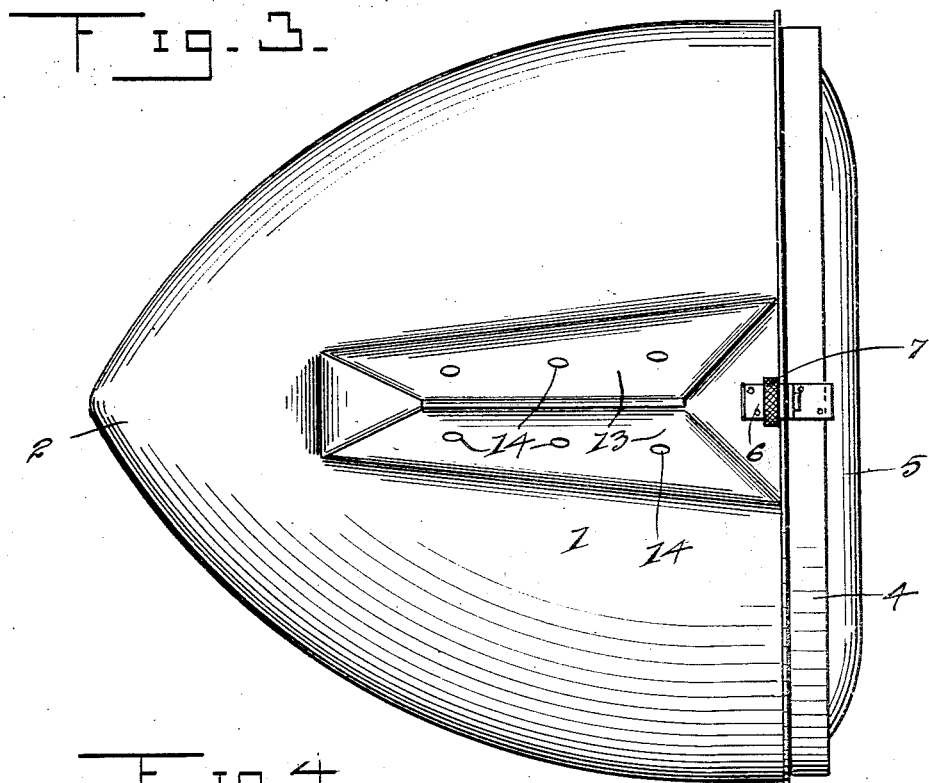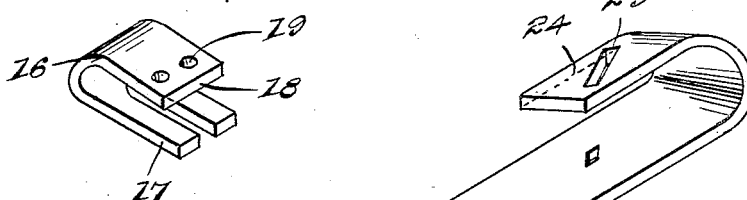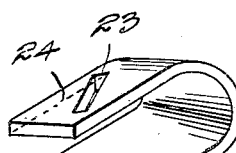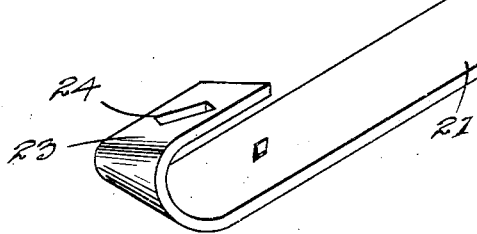

FRANK R. PIKE, OF ONTARIO, CALIFORNIA.

VEHICLE FENDER-LIGHT.

1,110,227.  Specification of Letters Patent.  Patented Sept. 8, 1914.

Application filed April 2, 1914. Serial No. 829,074.

*To all whom it may concern:*

Be it known that I, FRANK R. PIKE, a citizen of the United States, residing at Ontario, in the county of San Bernardino and State of California, have invented certain new and useful Improvements in Vehicle Fender-Lights; and I do hereby declare the following to be a full, clear, and exact description of the invention, such as will enable others skilled in the art to which it appertains to make and use the same.

My invention relates to new and useful improvements in lights for vehicles, particularly automobiles and resides in the provision of a novel form of light that is so constructed as to be readily adapted to be attached to the fenders of an automobile or vehicle, said light being arranged to be attached to different styles of vehicles and being readily removable.

An important object of my invention is to provide a vehicle light of the character described which is of a simple construction, light, strong and durable and which is cheap to manufacture.

Another important object of invention is to provide novel means whereby the light that is the casing thereof may be adjusted so as to be properly positioned upon the fender in the correct alinement therewith.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts: Figure 1 is a side elevation partly in section showing my improved light attached to the fender of a vehicle, Fig. 2 is a front elevation, Fig. 3 is a top plan view, Fig. 4 is a detail perspective view of the adjustable fastening means for detachably securing the lamp to the fender that is employed at the rear end of the light, and Fig. 5 is a detail perspective view of the means for detachably and adjustably securing the light to the fender that is to be used in connection with the forward portion of the light.

Referring to the drawings, the numeral 1 designates as an entirety, a light or lamp casing which is constructed of some suitably light metal and provided with a reduced rear end 2 and an enlarged front open end opposite thereto to which latter is hinged, as at 3, a lens frame 4 carrying the usual lens 5. Apertured extensions are carried by the casing 1 and the lens frame 4 and receive fastening means 6 having an adjusting or locking nut 7 thereon. This arrangement provides for the locking of the lens frame 4 and lens 5 in closed position. In order to provide for the proper fitting of the lamp casing to the curved forward end 8 of a fender, I provide a flat rearwardly and upwardly inclined bottom wall 9 for the casing 1. This flat bottom wall 9 is disposed approximately parallel with the portion 8 of the fender and to which the light 1 is to be attached.

A compartment 10 is formed at the upper part of the casing 1 longitudinally for a distance approximately equivalent to one-half the length of the casing. The compartment 10 is formed by a partition wall 11 having a plurality of apertures 12 therein. The partition 11 is arranged in a horizontal plane in spaced relation but adjacent to the upper portion of the casing 1. The other wall of the compartment is formed by disposing the casing 1 upwardly in a convergent plane as at 13, said upwardly converging portions being provided with a plurality of apertures 14. The compartment 10 and corresponding parts enable the ventilation of the casing when gas or oil is used for the illuminating medium. In this connection it will be noted that I have provided an opening 15 in one side of the casing 1 adjacent to the inclined bottom wall 9 so as to permit the connection of tubes or wires as the case may be with the illuminating means interiorly of the casing.

In connection with the rear reduced end 2 of the casing 1, I provide an approximately U-shaped securing rear bracket 16 consisting of a longer longitudinally slotted arm 17 and a shorter arm 18 provided with apertures 19 through which rivets or other suitable fastening means are inserted to secure the bracket 16 to the rear end of the flat wall 9 of the casing 1. The slot in the longer arm 17 opens at the free end of said arm and is designed to receive the shank portion of a bolt or rivet 20 that is to be inserted in the fender to which the light casing is to be attached.

The U-shaped bracket 16 is to be secured upon the casing 1 and to secure the rear end of the casing it is only necessary to provide a headed projection or bolt 20 upon the fender so that the slotted arm 17 may be arranged to receive the projection or bolt 20.

To provide for the securing of the forward end of the casing 1, I employ a front bracket comprising an elongated bar 21 that is secured by bolts or other suitable fastening means 22 transversely of the portion 8 of the fender to which the light is to be attached and provided with inwardly turned terminals 23. The inwardly turned terminals 23 are provided with diagonally extending closed end slots 24 therein and are designed to engage angularly disposed flat portions 25 that extend transversely of the bottom wall 9 at the forward end thereof and are disposed in approximately the same plane as the bent over terminals 23. Bolts or other suitable fastening means 26 are inserted through the slots 24 and the flat portions 25 of the casing 1. Nuts 26' are turned upon the upper unheaded terminals of the bolts 26. It will be readily seen that a slight adjustment is permitted the casing 1 relative to the fender through the medium of the diagonal slots 24 in the terminals 23 of the bars.

To attach my improvement to the fender of an automobile or other vehicle, the bolt 20 and the front bracket are first secured to the top of the downwardly inclined front portion of the fender. The front bracket should be located in a vertical plane extending transversely of the forward part of the fender, and the bolt 20 should be located in rear of the front bracket and in a vertical plane extending transversely of the bracket. The lamp may then be applied by bringing the rear bracket 16 into engagement with the bolt 20 and by registering the openings in the flat portion 25 of the inclined wall 9 with the slots 24 in the front bracket. The bolts 26 are then applied. Owing to the diagonal arrangement of the slots 24, a limited latitude is allowed in positioning the bolt 20 with relation to the front bracket.

In connection with my improved lamp, an electric bulb or oil burner may be employed, which may be secured therein in any suitable manner. In side elevation the lamp is substantially cone shaped, while in front elevation it is substantially crown shaped, whereby to give to the lamp a highly artistic appearance.

It should be apparent from the above description, taken in connection with the accompanying drawings, that my improved lamp, is simple, durable and efficient, that it is of a highly artistic appearance, that it can be manufactured and sold at a comparatively low cost, and that it may be readily and quickly attached to the fender of an automobile or other vehicle.

Having thus fully described my invention, what I claim as new and desire to secure by Letters Patent is:

1. In combination with a fender and a lamp, of a bracket secured to the fender, said bracket having diagonally arranged slots, bolts passing through said slots and the front portion of lamp, and means securing the rear portion of the lamp to the fender.

2. In combination with a fender and a lamp, of a bracket secured to the fender and provided with diagonally arranged slots, means passing through the slots and engaging the lamp, a bolt secured to the fender, and a bracket secured to the lamp and having a forked portion engaging said bolt.

3. In combination with a fender and a lamp, of a bracket secured to the fender and provided with upwardly turned ends, said ends being provided with diagonally arranged slots, a headed bolt secured on the fender, a bracket secured to the lamp and provided with a downwardly and forwardly extending portion slotted to engage under the head of said bolt, and bolts passing through said slots and engaging the lamp.

In testimony whereof I affix my signature in presence of two witnesses.

FRANK R. PIKE.

Witnesses:
GUILFORD R. JENKINS,
B. B. MARVIN